United States Patent
Cao et al.

(10) Patent No.: US 11,773,305 B2
(45) Date of Patent: Oct. 3, 2023

(54) RADICAL CURED SILICONE PRESSURE SENSITIVE ADHESIVE AND COMPOSITION AND METHOD FOR ITS PREPARATION AND USE IN A FLEXIBLE DISPLAY DEVICE

(71) Applicant: Dow Silicones Corporation, Midland, MI (US)

(72) Inventors: Qing Cao, Shanghai (CN); Yan Zhou, Shanghai (CN); Bochi Xu, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/918,010

(22) PCT Filed: Apr. 27, 2021

(86) PCT No.: PCT/CN2021/090248
§ 371 (c)(1),
(2) Date: Oct. 10, 2022

(87) PCT Pub. No.: WO2022/226779
PCT Pub. Date: Nov. 3, 2022

(65) Prior Publication Data
US 2023/0193093 A1    Jun. 22, 2023

(51) Int. Cl.
*C09J 183/04* (2006.01)
*C09J 11/06* (2006.01)
*C09J 7/38* (2018.01)
*G09F 9/30* (2006.01)

(52) U.S. Cl.
CPC ............. *C09J 183/04* (2013.01); *C09J 7/38* (2018.01); *C09J 11/06* (2013.01); *C09J 2301/302* (2020.08); *C09J 2301/408* (2020.08); *G09F 9/301* (2013.01)

(58) Field of Classification Search
CPC ... C09J 183/04; C09J 7/38; C09J 11/06; C09J 2301/302; C09J 2301/408; G09F 9/301
See application file for complete search history.

(56) References Cited

U.S. PATENT DOCUMENTS

| | | | |
|---|---|---|---|
| 2,431,878 | A | 12/1947 | McGregor et al. |
| 2,644,805 | A | 7/1953 | Martin et al. |
| 2,676,182 | A | 4/1954 | Daudt et al. |
| 2,842,521 | A | 7/1958 | Nitzsche et al. |
| 3,020,308 | A | 2/1962 | Stange et al. |
| 3,050,490 | A | 8/1962 | Nitzsche et al. |

(Continued)

FOREIGN PATENT DOCUMENTS

| CN | 105733497 | 7/2016 |
|---|---|---|
| CN | 108047449 | 5/2018 |

(Continued)

OTHER PUBLICATIONS

Technical Datasheet Dowsil™ 7429 PSA Additive.

(Continued)

*Primary Examiner* — Daniel H Lee
(74) *Attorney, Agent, or Firm* — Catherine Brown (57) ABSTRACT

A silicone pressure sensitive adhesive is prepared by curing a radical reaction curable composition. The silicone pressure sensitive adhesive adheres to various silicone elastomers and is useful in preparation of components of flexible display devices.

18 Claims, 1 Drawing Sheet

(56) References Cited

U.S. PATENT DOCUMENTS

| | | |
|---|---|---|
| 3,050,491 A | 8/1962 | Nitzsche et al. |
| 3,070,559 A | 12/1962 | Nitzsche et al. |
| 3,070,567 A | 12/1962 | Nitzsche et al. |
| 3,146,799 A | 9/1964 | Fekete et al. |
| 3,177,176 A | 4/1965 | Boot et al. |
| 3,213,048 A | 10/1965 | Boot et al. |
| 3,230,121 A | 1/1966 | Nitzsche et al. |
| 3,231,542 A | 1/1966 | Eisinger et al. |
| 3,296,182 A | 1/1967 | Fekete et al. |
| 3,330,797 A | 7/1967 | Kelly et al. |
| 3,379,607 A | 4/1968 | Foster et al. |
| 4,371,493 A | 2/1983 | Minuto |
| 4,487,810 A | 12/1984 | Ascarelli et al. |
| 4,611,042 A | 9/1986 | Rivers-Farrell et al. |
| 4,713,405 A | 12/1987 | Koga et al. |
| 4,774,310 A | 9/1988 | Butler |
| 5,082,706 A | 1/1992 | Tangney |
| 6,576,051 B2 | 6/2003 | Bardman et al. |
| 6,703,120 B1 | 3/2004 | Ko et al. |
| 6,730,397 B2 | 5/2004 | Melancon et al. |
| 8,580,073 B2 | 11/2013 | Behl et al. |
| 8,785,507 B2 | 7/2014 | Bloomfield |
| 8,853,332 B2 | 10/2014 | Hasegawa et al. |
| 8,859,693 B2 | 10/2014 | Hasegawa et al. |
| 9,550,864 B2 | 1/2017 | Bloomfield |
| 9,593,209 B2 | 3/2017 | Dent et al. |
| 10,370,499 B2 | 8/2019 | Kumar et al. |
| 10,444,798 B2 | 10/2019 | Choi et al. |
| 10,920,113 B2 | 2/2021 | Park et al. |
| 10,935,700 B2 | 3/2021 | Hashimoto et al. |
| 11,149,175 B2 | 10/2021 | Jang et al. |
| 2007/0148475 A1 | 6/2007 | Sherman et al. |
| 2009/0061338 A1 | 3/2009 | Wu |
| 2016/0376482 A1 | 12/2016 | Morgeneyer et al. |
| 2017/0200915 A1 | 7/2017 | Lee et al. |
| 2018/0126706 A1 | 5/2018 | Erdogan-Haug et al. |
| 2018/0208799 A1 | 7/2018 | Liu et al. |
| 2020/0071578 A1 | 3/2020 | Huo et al. |
| 2021/0062048 A1 | 3/2021 | Galush et al. |
| 2021/0309899 A1* | 10/2021 | Jiang ................. C08G 77/12 |

FOREIGN PATENT DOCUMENTS

| | | |
|---|---|---|
| CN | 110494528 | 11/2019 |
| CN | 111194341 | 5/2020 |
| JP | 1984155483 | 10/1984 |
| JP | 1986089281 | 6/1986 |
| JP | 2003327833 | 11/2003 |
| JP | 2009203470 | 9/2009 |
| KR | 102240167 | 4/2021 |
| WO | 2001058972 | 8/2001 |
| WO | 2009131838 | 10/2009 |
| WO | 2011039318 | 4/2011 |
| WO | 2013106193 | 1/2014 |
| WO | 2017214675 | 12/2017 |
| WO | 2020032285 | 2/2020 |
| WO | 2020248181 | 12/2020 |
| WO | 2021000279 | 1/2021 |
| WO | 2021000280 | 1/2021 |

OTHER PUBLICATIONS

Technical Datasheet Silastic™ MS-1001 Moldable Silicone.
Technical Datasheet Silastic™ MS-1002 Moldable Silicone.
Technical Datasheet Silastic™ MS-1003 Moldable Silicone.
Technical Datasheet Sylgard™ 184 Silicone Elastomer.
Technical Datasheet Xiameter™ RBB-2030-40 Base.
Technical Datasheet Xiameter™ RBB-6660-60 Base.
Test Method 0166 Plasticity and Recovery Jan. 25, 2016.
Search Report and Written Opinion / OEE Work Product from corresponding application No. PCT/CN2021/090248 dated Jan. 21, 2022.
Office Action from corresponding Japanese Application No. 2022-575268 dated Jun. 1, 2023.

* cited by examiner

RADICAL CURED SILICONE PRESSURE SENSITIVE ADHESIVE AND COMPOSITION AND METHOD FOR ITS PREPARATION AND USE IN A FLEXIBLE DISPLAY DEVICE

CROSS REFERENCE TO RELATED APPLICATIONS

This application is a U.S. national stage filing under 35 U.S.C. §371 of PCT Application No. PCT/CN2021/090248 filed on 27 Apr. 2021, currently pending. PCT Application No. PCT/CN2021/090248 is hereby incorporated by reference.

FIELD

This invention relates to a silicone pressure sensitive adhesive and methods for its preparation and use. More particularly, this invention relates to a radical reaction curable composition that cures to from a silicone pressure sensitive adhesive suitable for use in a flexible display device.

INTRODUCTION

Flexible display devices that can be deformed, e.g., by bending, folding, winding, rolling up, or stretching are being developed. Flexible display devices can be deformed depending on the needs of the consumer or the situations where the flexible display device is used. Typically, various components of display devices are made with multiple layers, and it is important for the layers to adhere to one another and not suffer damage causing failure of the component when the flexible display device is deformed.

Various silicone elastomers, including liquid silicone rubbers (LSRs) and high consistency rubbers (HCRs) may be useful for forming different layers in flexible display devices. Commercially available LSRs include SILASTIC™ 9202-50 LSR, SILASTIC™ LCF 3760, and SILASTIC™ LCF 3600. Optical LSRs include SILASTIC™ MS-1001, MS-1002, MS-1003, MS-4001, MS-4002, and MS-4007, which are moldable optical silicone elastomers, and SYLGARD™ 182, 184, and 186, which are also optical silicone elastomers. Commercially available HCRs include XIAMETER™ RBB-2030-40EN, XIAMETER™ RBB-6660-60EN, XIAMETER™ RBB-2002-30 Base, XIAMETER™ RBB-2004-60, and XIAMETER™ RBB-2220-70. Filled silicone elastomers, such as DOWSIL™ VE-8001 Flexible Silicone Adhesive are also suitable. All of these silicone elastomers are commercially available from Dow Silicones Corporation of Midland, Mich., USA.

However, silicone elastomers, such as those described above, may suffer from the drawback of being difficult to adhere to other layers in flexible display devices. Therefore, there is an industry need for a silicone pressure sensitive adhesive that can adhere to a silicone elastomer and that does not cause failure in a flexible display device.

SUMMARY

A radical reaction curable composition is capable of forming a silicone pressure sensitive adhesive. A method for making the composition, and a method for fabricating an article using the composition, are provided. The article may comprise a component of a flexible display device.

REFERENCE NUMERALS

100 portion of a flexible display device component
101 substrate
101b surface of substrate 101
102 silicone pressure sensitive adhesive
102a surface of silicone pressure sensitive adhesive 102
102b opposing surface of silicone pressure sensitive adhesive 102
103 silicone elastomer
103a surface of silicone elastomer 103

DETAILED DESCRIPTION

The radical reaction curable composition for forming the silicone pressure sensitive adhesive comprises:

(A) a polydiorganosiloxane gum component comprising
0 weight % to 16.3 weight %, based on combined weights of starting materials (A) to (D), of (A-1) an aliphatically unsaturated polydiorganosiloxane gum of unit formula $(R^M{}_2R^U SiO_{1/2})_2(R^M{}_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the aliphatically unsaturated polydiorganosiloxane gum a plasticity of 20 mil (0.51 mm) to 80 mil (2.03 mm); and 34.7 weight % to <51.8 weight % of (A-2) a hydroxyl-terminated polydiorganosiloxane gum of unit formula $((HO)R^M{}_2SiO_{1/2})_2(R^M{}_2SiO_{2/2})_{a'}$, where each $R^M$ is an independently selected monovalent hydrocarbon group of 1 to 30 carbon atoms that is free of aliphatic unsaturation; each subscript a' has a value sufficient to give the hydroxyl-terminated polydiorganosiloxane gum a plasticity of 20 mil (0.51 mm) to 80 mil (2.03 mm);

with the proviso that a weight ratio of (A-1) the aliphatically unsaturated polydiorganosiloxane gum:(A-2) the hydroxyl-terminated polydiorganosiloxane gum {(A-1):(A-2) ratio} is 0 to <0.47:1;

39.3 weight % to 45.4 weight % of (B) a polyorganosilicate resin of unit formula $(R^M{}_3SiO_{1/2})_{z'}(SiO_{4/2})_{o'}Z_{p'}$, where each $R^M$ is an independently selected monovalent hydrocarbon group of 1 to 30 carbon atoms that is free of aliphatic unsaturation, subscript p' has a value sufficient to give the resin a hydrolyzable group content of >3% to 10%, subscripts z' and o' have values such that z'>4, o'>1, and a quantity (z'+o') has a value sufficient to provide the resin with a number average molecular weight of 500 g/mol to 5,000 g/mol;

where (A) the polydiorganosiloxane gum component and (B) the polyorganosilicate resin are present in a weight ratio of (B):(A) (Resin:Gum Ratio)<1.1:1;

0.01 weight % to 5 weight %, based on combined weights of starting materials (A) to (D), of (C) a radical initiator;

0.03 weight % to 7.1 weight %, based on combined weights of starting materials (A) to (D), of (D) a trialkyl borate; and 0 weight % to 90 weight %, based on combined weights of all starting materials in the composition, of (E) a solvent.

(A) Polydiorganosiloxane Gum Component

The radical reaction curable composition comprises (A) the polydiorganosiloxane gum component. The polydiorganosiloxane gum component comprises: (A-2) the hydroxyl-terminated polydiorganosiloxane gum. The polydiorganosiloxane gum component may optionally further comprise (A-1) the aliphatically unsaturated polydiorganosiloxane gum.

Starting material (A-1), the aliphatically unsaturated polydiorganosiloxane gum has unit formula: $(R^M{}_2R^U SiO_{1/2})_2(R^M{}_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give (A-1) the aliphatically unsaturated polydiorganosiloxane gum a plasticity of 20 mil (0.51 mm) to 80 mil (2.03 mm), alternatively 30 mil (0.76 mm) to 70 mil (1.78 mm), and alternatively 50 mil (1.27 mm) to 65 mil (1.65 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926.

In unit formula (A-1), each $R^M$ is an independently selected monovalent hydrocarbon group of 1 to 30 carbon atoms that is free of aliphatic unsaturation. Alternatively, each $R^M$ may have 1 to 12 carbon atoms, and alternatively 1 to 6 carbon atoms. Suitable monovalent hydrocarbon groups for $R^M$ are exemplified by alkyl groups and aromatic groups such as aryl groups and aralkyl groups. "Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. "Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. "Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Alternatively, each $R^M$ may be independently selected from the group consisting of alkyl and aryl. Alternatively, each $R^M$ may be independently selected from methyl and phenyl. Alternatively, each $R^M$ may be alkyl. Alternatively, each $R^M$ may be methyl.

In unit formula (A-1), each $R^U$ is an independently selected monovalent aliphatically unsaturated hydrocarbon group of 2 to 30 carbon atoms. Alternatively, each $R^U$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a branched or unbranched, monovalent hydrocarbon group having one or more carbon-carbon double bonds. Suitable alkenyl groups are exemplified by vinyl, allyl, butenyl, pentenyl, hexenyl, and heptenyl, (including branched and linear isomers of 3 to 7 carbon atoms); and cyclohexenyl. "Alkynyl" means a branched or unbranched, monovalent hydrocarbon group having one or more carbon-carbon triple bonds. Suitable alkynyl groups are exemplified by ethynyl, propynyl, and butynyl (including branched and linear isomers of 2 to 4 carbon atoms). Alternatively, each $R^U$ may be alkenyl, such as vinyl, allyl, or hexenyl.

Polydiorganosiloxane gums are known in the art and may be prepared by methods such as hydrolysis and condensation of the corresponding organohalosilanes or equilibration of cyclic polydiorganosiloxanes. Examples of suitable polydiorganosiloxane gums for use in the radical reaction curable composition are exemplified by:
i) dimethylvinylsiloxy-terminated polydimethylsiloxane,
ii) dimethylvinylsiloxy-terminated poly(dimethylsiloxane/methylphenyl)siloxane,
iii) dimethylvinylsiloxy-terminated poly(dimethylsiloxane/diphenyl)siloxane,
iv) phenyl,methyl,vinyl-siloxy-terminated polydimethylsiloxane,
v) dimethylhexenylsiloxy-terminated polydimethylsiloxane,
vi) dimethylhexenyl-siloxy terminated poly(dimethylsiloxane/methylphenyl)siloxane,
vii) dimethylvinylsiloxy-terminated poly(dimethylsiloxane/diphenyl)siloxane,
viii) a combination of two or more of i) to vii). Alternatively, the polydiorganosiloxane gum may be selected from the group consisting of i) dimethylvinylsiloxy-terminated polydimethylsiloxane,
v) dimethylhexenylsiloxy-terminated polydimethylsiloxane, and a combination i) and v).

Starting material (A-1), the aliphatically unsaturated polydiorganosiloxane gum, is optional; and the amount of (A-1) the aliphatically unsaturated polydiorganosiloxane gum may be 0 in the radical reaction curable composition. When present in the radical reaction curable composition, (A-1) the aliphatically unsaturated polydiorganosiloxane gum may be present in an amount in an amount >0, alternatively at least 5 weight %, alternatively at least 6 weight %, alternatively at least 0 weight %, and alternatively at least 10 weight %, while at the same time the amount may be up to 16.3 weight %, alternatively up to 15 weight %, alternatively up to 11%, and alternatively up to 10 weight %, based on combined weights of starting materials (A) to (D). Alternatively, the amount of (A-1) the aliphatically unsaturated polydiorganosiloxane gum may be >0 weight % to 16.3 weight %, alternatively 10 weight % to 16.3 weight %, and alternatively 11 weight % to 16.3 weight %, based on combined weights of starting materials (A) to (D).

Starting material (A) the polydiorganosiloxane component comprises (A-2) a hydroxyl-terminated polydiorganosiloxane gum of unit formula: $\{(HO)R^M{}_2SiO_{1/2}\}_2(R^M{}_2 SiO_{2/2})_{a'}$, where $R^M$ is as described above; and subscript a' has a value sufficient to give (A-2) the hydroxyl-terminated polydiorganosiloxane gum a plasticity of 20 mil (0.51 mm) to 80 mil (2.03 mm), alternatively 30 mil (0.76 mm) to 70 mil (1.78 mm), and alternatively 50 mil (1.27 mm) to 65 mil (1.65 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926.

Hydroxyl-terminated polydiorganosiloxane gums suitable for use as starting material (A-2) are known in the art and may be prepared by methods such as hydrolysis and condensation of the corresponding organohalosilanes or equilibration of cyclic polydiorganosiloxanes. Examples of suitable hydroxyl-terminated polydiorganosiloxane gum for use as starting material (A-2) in the radical reaction curable composition are exemplified by:

i) bis-hydroxyl-terminated polydimethylsiloxane,
ii) bis-hydroxyl-terminated poly(dimethylsiloxane/methylphenylsiloxane),
iii) bis-hydroxyl-terminated poly(dimethylsiloxane/diphenylsiloxane),
iv) phenyl,methyl,hydroxyl-siloxy-terminated polydimethylsiloxane,
v) a combination of two or more of i) to iv). Alternatively, starting material (A-2) comprise bis-hydroxyl-terminated polydimethylsiloxane.

Starting material (A-2) the hydroxyl-terminated polydiorganosiloxane gum is present in the radical reaction curable composition in an amount of 34.7 weight % to 51.8 weight %, based on combined weights of starting materials (A) to (D). Alternatively, (A-2) the hydroxyl-terminated polydiorganosiloxane gum may be present in an amount of at least 34.7 weight %, alternatively at least 35 weight %, alternatively at least 37 weight %, and alternatively at least 38 weight %; while at the same time the amount may be up to 51.8 weight %, alternatively up to 40.3 weight %, and up to 40 weight %, on the same basis.

Starting material (A-1) the aliphatically unsaturated polydiorganosiloxane gum is optional and its amount may be 0 in the radical reaction curable composition. However, when starting material (A-1) is present, (A-1), the aliphatically unsaturated polydiorganosiloxane gum, and (A-2) the bis-hydroxyl-terminated polydiorganosiloxane, may be present in amounts such that a weight ratio (A-1):(A-2) may be >0:1 to 0.47:1, alternatively >0:1 to 0.4:1, and alternatively >0:1 to 0.3:1. Alternatively, the weight ratio (A-1):(A-2) may be at least 0.1:1, alternatively at least 0.2:1, and alternatively at least 0.28:1; while at the same time, the weight ratio (A-1):(A-2) may be up to 0.47:1, alternatively up to 0.3:1, and alternatively up to 0.3:1, when (A-1) the aliphatically unsaturated polydiorganosiloxane gum is present. Alternatively, the ratio (A-1):(A-2) may be 0.28:1 to 0.47:1.

(B) Polyorganosilicate Resin Component

The radical reaction curable composition further comprises starting material (B), a polyorganosilicate resin. Polyorganosilicate resins, which comprises monofunctional units ("M" units) of formula $R^M_3SiO_{1/2}$ and tetrafunctional silicate units ("Q" units) of formula $SiO_{4/2}$, where $R^M$ is as described above. Alternatively, at least one-third, alternatively at least two thirds of the $R^M$ groups are alkyl groups (e.g., methyl groups). Alternatively, the M units may be exemplified by $(Me_3SiO_{1/2})$ and $(Me_2PhSiO_{1/2})$. The polyorganosilicate resin is soluble in solvents such as those described below, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-siRM_3)_4$, where $R^M$ is as described above, e.g., the neopentamer may be tetrakis(trimethylsiloxy)silane. $^{29}Si$ NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin is 500 g/mol to 5,000 g/mol, alternatively 2,500 g/mol to 5,000 g/mol, alternatively 2,700 g/mol to 4,900 g/mol, alternatively 2,900 g/mol to 4,700 g/mol, and alternatively 3,800 g/mol to 4,300 g/mol. A suitable GPC test method for measuring Mn is disclosed in U.S. Pat. No. 9,593,209, Reference Example 1 at col. 31.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the radical reaction curable composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above is an uncapped resin, which typically contains silicon bonded hydroxyl groups, e.g., of formulae, $HOSi_{3/2}$ and/or $HOR^M_2SiO_{1/2}$. The polyorganosilicate resin may comprise >3% to 10% of silicon bonded hydroxyl groups, as measured by NMR spectroscopy.

Starting material (B), the polyorganosilicate resin, may have unit formula $(R^M_3SiO_{1/2})_{z'}(SiO_{4/2})_{o'}Z_{p'}$, where $R^M$ is as described above and subscripts z' and o' have values such that o'>1, and subscript z'>4, a quantity (o'+z') has a value sufficient to give the resin the Mn described above (e.g., 500 g/mol to 5,000 g/mol, alternatively 1,000 g/mol to 4,700 g/mol, alternatively 2,900 g/mol to 4,700 g/mol, alternatively 2,900 g/mol to 4,500 g/mol, and alternatively 3,800 g/mol to 4,300 g/mol), and subscript p' has a value sufficient to give the resin a hydrolyzable group content as described above (e.g., >3% to 10%). Starting material (B) the polyorganosilicate resin may be present in an amount of >0 weight % to 1.5 weight %, alternatively 1.25 weight % to 1.45 weight %, and alternatively 1.26 weight % to 1.42 weight %, based on combined weights of starting materials (A) to (D).

The radical reaction curable composition comprises (B) the polyorganosilicate resin component in an amount of 39.3 weight % to 45.4 weight %, alternatively 39.3 weight % to 45 weight %, alternatively 39.3 weight % to 44.9 weight %, and alternatively 39.3 weight % to 43.9 weight % based on combined weights of starting materials (A) to (D).

Starting material (A) the polydiorganosiloxane gum component, and starting material (B), the polyorganosilicate resin may be present in the radical reaction curable composition in amounts sufficient to provide a weight ratio of (B) polyorganosilicate resin:(A) polydiorganosiloxane gum component {i.e., (B):(A) ratio}≤1.1:1. Alternatively, the (B):(A) ratio may be at least 0.77:1, alternatively at least 0.8:1; while at the same time the (B):(A) ratio may be up to 1.:1, alternatively up to 0.8:1. Alternatively, the (B):(A) ratio may be 0.7:1 to 0.9:1; alternatively 0.77:1 to 0.88:1.

(C) Radical Initiator

Starting material (C) in the radical reaction curable composition is a radical initiator. Suitable radical initiators may comprise a peroxide compound, an azo compound, or a redox pair. The peroxide compound may be an organic peroxide or a hydroperoxide, such as benzoyl peroxide; 4-monochlorobenzoyl peroxide; t-butylperoctoate; t-butyl peroxybenzoate, tert-butylperoxybenzoate, tert-butyl cumyl peroxide, tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; dicumyl peroxide; di-t-butyl peroxide; t-butyl hydroperoxide; cumene hydroperoxide; di-t-amyl peroxide; and combinations of two or more thereof. Additionally, di-peroxide radical initiators may be used alone or in combination with other radical initiators. Such di-peroxide radical initiators include, but are not limited to, 1,4-bis-(t-butyl peroxycarbo)cyclohexane; 1,2-di(t-butyl peroxy)cyclohexane; and 2,5-di(t-butyl peroxy)-3-hexyne. Suitable peroxide compounds are known in the art and are commercially available from various sources, such as Sigma-Aldrich, Inc. of St. Louis, Mo., USA.

The azo compound may be an aliphatic azo compound such as 1-t-amylazo-1-cyanocyclohexane; azo-bis-isobutyronitrile; and 1-t-butylazo-cyanocyclohexane; 2,2'-azo-bis-(2-methyl)butyronitrile; 2,2'-azobis(2-methylpropionitrile); 2,2'-azobis(2-methylpropionamidine) dihydrochloride; 2,2'-azobis(cyanovaleric acid); or a combination of two or more thereof. Azo compounds are known in the art and are commercially available, e.g., under the tradename VAZO™ WSP from The Chemours Company of Wilmington, Del., USA.

Alternatively, (C) the radical initiator may comprise isoascorbic acid. Alternatively, (C) the radical initiator may be a redox pair, which comprises an initiator as the oxidizing component and a reducing component. Alternatively, a redox pair including isoascorbic acid and a hydrophobic organic hydroperoxide such as t-amyl hydroperoxide or t-butyl hydroperoxide may be used as (C) the radical initiator. Examples of suitable initiators and/or redox pairs are disclosed in U.S. Pat. No. 6,576,051 to Bardman et al., beginning at col. 11, line 16.

Starting material (C) may comprise one radical initiator or a combination of two or more radical initiators. The amount of starting material (C) added to the radical reaction curable composition depends on various factors including the type and amount of radical initiator selected and the selection of (A) the polydiorganosiloxane gum component and (B) the polyorganosilicate resin, however, (C) the radical initiator may be present in an amount of 0.1 weight % to 5 weight %, alternatively 1 weight % to 4 weight %, alternatively 2 weight % to 3 weight %, based on combined weights of starting materials (A) to (D).

(D) Trialkyl Borate

Starting material (D) in the radical reaction curable composition is a trialkyl borate of formula $B(OR^4)_3$, where each RA is an independently selected alkyl group of 1 to 30 carbon atoms, alternatively 1 to 12 carbon atoms, and alternatively 1 to 6 carbon atoms. The alkyl group may be methyl, ethyl, propyl (e.g., iso-propyl or n-propyl), butyl (e.g., isobutyl, n-butyl, tert-butyl, or sec-butyl), pentyl (e.g., isopentyl, neopentyl, or tert-pentyl), hexyl, a branched alkyl group of 6 carbon atoms, or a cyclic alkyl group such as cyclopentyl or cyclohexyl. Examples of suitable trialkyl borates include trimethyl borate, triethyl borate, tributyl borate, and combinations of two or more thereof. Alternatively, the trialkyl borate may be triethyl borate.

Trialkyl borates are known in the art and may be made by known methods, such as that described in U.S. Pat. No. 3,020,308 to Stange. Trialkyl borates are also commercially available, for example, triethyl borate is available from Meryer (Shanghai) Chemical Technology Co., Ltd., and trialkyl borate additives for silicone compositions are also known in the art, such as DOWSIL™ 7429 PSA Additive, which is available from Dow Silicones Corporation.

The amount of (D) the trialkyl borate added to the radical curable composition is 0.3 weight % to 7.1 weight %, based on combined weights of starting materials (A) to (D). Alternatively, the amount of (D) the trialkyl borate may be at least 0.3 weight %, alternatively at least 1 weight %, and alternatively at least 1.5%; while at the same time the amount may be up to 7.1 weight %, alternatively up to 4 weight %, alternatively up to 3.92 weight %, alternatively up to 1.6 weight %, and alternatively up to 1.58 weight %, on the same basis. Alternatively, the amount of (D) the trialkyl borate may be 1.5 weight % to 7.1 weight %, and alternatively 3.9 weight % to 7.1 weight %, on the same basis.

(E) Solvent

The radical reaction curable composition may optionally further comprise starting material (E), a solvent. The solvent may be an organic solvent such as a hydrocarbon, a ketone, an ester acetate, an ether, and/or a cyclic siloxane having an average degree of polymerization from 3 to 10. Suitable hydrocarbons for the solvent can be (E-1) an aromatic hydrocarbon such as benzene, toluene, or xylene; (E-2) an aliphatic hydrocarbon such as hexane, heptane, octane, or iso-paraffin; or (E-3) a combination thereof. Alternatively, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10, alternatively 3 to 6, include hexamethylcyclotrisiloxane, octamethylcyclotetrasiloxane, and/or decamethylcyclopentasiloxane. Alternatively, the solvent may be selected from the group consisting of benzene, toluene, xylene, heptane, ethyl benzene, ethyl acetate, and a combination of two or more thereof.

The amount of solvent will depend on various factors including the type of solvent selected and the amount and type of other starting materials selected for the radical reaction curable composition. However, the amount of solvent may range from 0% to 90%, alternatively 0% to 60%, alternatively 20 to 60%, alternatively 45% to 65%, and alternatively 50% to 60%, based on combined weights of all starting materials in the radical reaction curable composition. The solvent can be added during preparation of the radical reaction curable composition, for example, to aid mixing and delivery of one or more starting materials, described above. All or a portion of the solvent may be added with one or more of the other starting materials. For example, the polyorganosilicate resin and/or the radical initiator, may be dissolved in a solvent before combination with the other starting materials in the radical reaction curable composition. All or a portion of the solvent may optionally be removed after the radical reaction curable composition is prepared.

Method of Making the Radical Reaction Curable Composition

The radical reaction curable composition can be prepared by a method comprising combining all starting materials as described above by any convenient means such as mixing at ambient or elevated temperature. The radical reaction inhibitor may be added before the radical initiator, for example, when the radical reaction curable composition will be prepared at elevated temperature and/or the radical reaction curable composition will be prepared as a one part composition.

The method may further comprise delivering one or more starting materials in a solvent (e.g., the radical initiator and/or the polyorganosilicate resin) may be dissolved in a solvent when combined with one or more of the other starting materials in the radical reaction curable composition. One skilled in the art would understand that if it is desired that the resulting radical reaction curable composition will be solventless (i.e., will contain no solvent or may contain trace amounts of residual solvent from delivery of a starting material), then solvent may be removed after mixing two or more of the starting materials, and in this instance, solvent is not intentionally added to the radical reaction curable composition.

Alternatively, the radical reaction curable composition may be prepared as a multiple part composition, for example, when the radical reaction curable composition will be stored for a long period of time before use, e.g., up to 6 hours before applying the radical reaction curable composition on an optical silicone elastomer or other substrate. In the multiple part composition, the radical initiator is stored in a separate part from any starting material having a silicon bonded hydrogen hydroxyl group, for example (A) the polydiorganosiloxane gum component and (B) the polyorganosilicate resin, and the parts are combined shortly before use of the radical reaction curable composition.

For example, a multiple part composition may be prepared by combining starting materials comprising at least some of the polydiorganosiloxane gum component, the polyorganohydrogensiloxane, and optionally one or more other starting materials described above (other than the radical initiator) to form a base part, by any convenient means such as mixing. A curing agent may be prepared by combining starting materials comprising the radical initiator, and optionally one or more other starting materials described above (other than the polydiorganosiloxane gum component and the polyorganosilicate resin) by any convenient means such as mixing. The starting materials may be combined at ambient or elevated temperature. The solvent may be added to the base part, the curing agent part, or a separate additional part. Alternatively, starting materials comprising the polyorganosilicate resin and some or all of the solvent may be added in a separate additional part. When a two part composition is used, the weight ratio of amounts of base part to curing agent part may range from 1:1 to 10:1. The radical reaction curable composition will cure via radical reaction to form the silicone pressure sensitive adhesive.

Method of Use

The method described above may further comprise one or more additional steps. The radical reaction curable composition prepared as described above may be used to form an adhesive article, e.g., a silicone pressure sensitive adhesive (prepared by curing the radical reaction curable composition described above) on a substrate. The method may, therefore, further comprise comprises applying the radical reaction curable composition to a substrate.

Applying the radical reaction curable composition to the substrate can be performed by any convenient means. For example, the radical reaction curable composition may be applied onto a substrate by gravure coater, comma coater, offset coater, offset-gravure coater, roller coater, reverse-roller coater, air-knife coater, slot die, or curtain coater.

The substrate can be any material that can withstand the curing conditions (described below) used to cure the radical reaction curable composition to form the silicone pressure sensitive adhesive on the substrate. For example, any substrate that can withstand heat treatment at a temperature equal to or greater than 120° C., alternatively 150° C. is suitable. Examples of materials suitable for such substrates including polymeric films and/or foams, which may be comprised of polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), polymethylmethacrylate (PMMA), thermoplastic polyurethane (TPU), thermoplastic elastomer (TPE), polyethylene (PE), or polypropylene (PP). Alternatively, the substrate may be glass. Alternatively, the substrate may be a release liner, for example, when the silicone pressure sensitive adhesive will be used in a dry casting method. The thickness of the substrate is not critical, however, the thickness may be 5 μm to 300 μm, alternatively 10 μm to 200 μm. Alternatively, the substrate may be selected from the group consisting of PE, PU, TPE, TPU, and a silicone elastomer.

Liquid silicone rubbers (LSRs) and high consistency rubbers (HCRs) may be used for the silicone elastomer. The silicone elastomer may be selected based on the use in the flexible display device, i.e., the component of the flexible display device to be fabricated.

For example, optical silicone elastomers (optical LSRs) are known in the art and are described, for example, in U.S. Pat. No. 8,859,693 to Hasegawa, et al. and U.S. Pat. No. 8,853,332 to Akitomo, et al. Optical LSRs are commercially available. For example, optical LSRs include SILASTIC™ MS-1001, MS-1002, MS-1003, MS-4001, MS-4002, and MS-4007, which are moldable optical silicone elastomers, and SYLGARD™ 182, 184, and 186 are other optical silicone elastomers, all of which are commercially available from Dow Silicones Corporation. These LSRs are suitable for fabricating optical components in a flexible display device.

Alternatively, when the component of the flexible display device to be fabricated is a lens (frame) component, an LSR such as, SILASTIC™ 9202-50 LSR, SILASTIC™ LCF 3760, and SILASTIC™ LCF 3600, or an HCR such as XIAMETER™ RBB-2030-40EN, XIAMETER™ RBB-6660-60EN, XIAMETER™ RBB-2002-30 Base, XIAMETER™ RBB-2004-60, or XIAMETER™ RBB-2220-70 may be used.

Alternatively, when the component of the flexible display device to be fabricated is a hinge component, a filled silicone elastomer, such as DOWSIL™ VE-8001 Flexible Silicone Adhesive may be used. All silicone elastomers branded DOWSIL™, SILASTIC™, SYLGARD™, and XIAMETER™ are commercially available from Dow Silicones Corporation.

To improve bonding of the silicone pressure sensitive adhesive to the substrate, the method for forming the adhesive article may optionally further comprise treating the substrate before applying the radical reaction curable composition or the silicone pressure sensitive adhesive. Treating the substrate may be performed by any convenient means, such as applying a primer, or subjecting the substrate to corona-discharge treatment, etching, or plasma treatment before applying the radical reaction curable composition or the silicone pressure sensitive adhesive to the substrate.

The method described herein may optionally further comprise applying a removable release liner to the silicone pressure sensitive adhesive opposite the substrate, e.g., to protect the silicone pressure sensitive adhesive before use of the adhesive article. The release liner may be applied before, during or after curing the radical reaction curable composition; alternatively after curing. The adhesive article may be a component for use in a flexible display device, such as an optical component, a lens (frame) component, or a hinge component.

Figure 1:
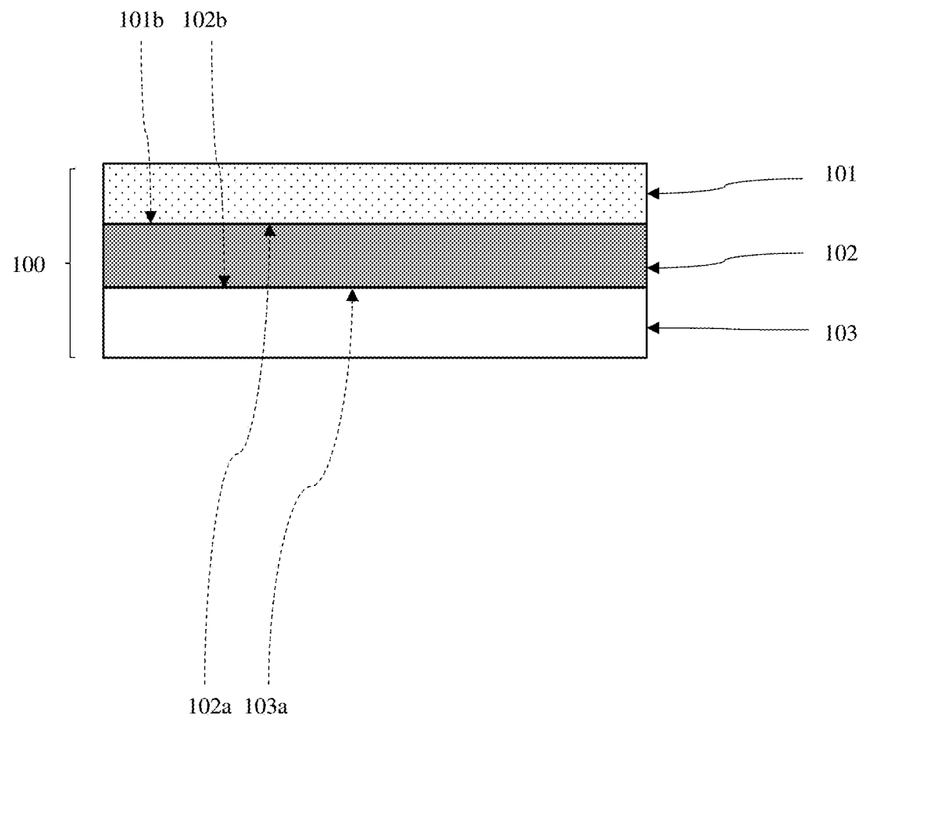
FIG. 1 shows a partial cross section of a component of a flexible display device 100.

Use of the Silicone Pressure Sensitive Adhesive in a Component of a Flexible Display Device FIG. 1 shows a partial cross section of a flexible display device component (100). The component (100) includes a silicone pressure sensitive (102) having a surface (102a) and an opposing surface (102b). The opposing surface (102b) of the silicone pressure sensitive (102) adheres to the surface (103a) of the silicone elastomer (103) with a peel adhesion of >400 W/in as measured by the test method described in the EXAMPLES, below. The silicone pressure sensitive (102) may have a thickness of 10 μm to 200 μm. The silicone pressure sensitive (102) adheres to a substrate (101) having a surface (101a) and an opposing surface (101b). The surface (102a) of the silicone pressure sensitive (102) contacts the opposing surface (101b) of the substrate (101). The substrate (101) may be selected from the group consisting of PE, PU, TPU, TPE, and a silicone elastomer (which may be the same as, or different from, the silicone elastomer (103) and may have a thickness of 10 μm to 200 μm. The silicone elastomer (103) may be an HCR, as described above.

The radical reaction curable composition and method described above may be used in fabrication of the flexible display device component (100) via wet casting. For example, the radical reaction curable composition may be applied to the opposing surface (101b) of the substrate (101) and cured to form the silicone pressure sensitive adhesive (102). Alternatively, the radical reaction curable composition described herein may be applied to the surface (103a) of the silicone elastomer (103) and cured to form the silicone pressure sensitive adhesive (102). Alternatively, radical reaction curable composition may be applied to a surface of a release liner and cured to form the silicone pressure sensitive adhesive (102). Thereafter, the silicone elastomer (103) may be contacted with the opposing surface (102b) of the silicone pressure sensitive adhesive (102) and the substrate (101) may be contacted with the surface (102a) of the silicone pressure sensitive adhesive (102). Pressure may be applied to adhere the layers of substrate (101), silicone pressure sensitive adhesive (102), and silicone elastomer (103) together.

EXAMPLES

The following examples are provided to illustrate the invention to one skilled in the art and are not to be interpreted as limiting the invention set forth in the claims. Starting materials used herein are described in Table 1.

TABLE 1

Starting Materials

| Starting Material | Source | Chemical Description |
|---|---|---|
| GUM 1 | Dow Silicones Corporation | Bis-dimethylvinylsiloxy-terminated polydimethylsiloxane gum with the average unit formula of $M^{Vi}D_{5836}M^{Vi}$, having the plasticity of 60 mil (1.52 mm) |
| GUM 2 | Dow Silicones Corporation | Bis-hydroxyl-terminated polydimethylsiloxane gum with the average unit formula of $M^{OH}D_xM^{OH}$, where subscript x is sufficient to give the gum a plasticity of 53 mil (1.35 mm) |
| GUM 3 | Dow Silicones Corporation | Bis-hydroxyl-terminated polydimethylsiloxane gum with the average unit formula of $M^{OH}D_xM^{OH}$, where subscript x is sufficient to give the gum a plasticity of 60 mil (1.52 mm) |
| GUM 4 | Dow Silicones Corporation | Bis-hydroxyl-terminated polydimethylsiloxane gum with the average unit formula of $M^{OH}D_xM^{OH}$, where subscript x is sufficient to give the gum a plasticity of 58 mil (1.47 mm) |
| MQ Resin | Dow Silicones Corporation | Uncapped polymethylsilicate resin with Mw = 11200 g/mol; Mn = 3800 g/mol, and hydoxyl content of 3.4% |
| MQ Resin 1 | Dow Silicones Corporation | Uncapped polymethylsilicate resin with Mw = 16500 g/mol; Mn = 4300 g/mol, and hydroxyl content of 3.4% |
| MQ Resin 2 | Dow Silicones Corporation | uncapped polymethylsilicate resin with Mw = 6000 g/mol; Mn = 2700 g/mol and hydroxyl content of 3.4% |
| MQ Resin 3 | Dow Silicones Corporation | Me-capped polymethylsilicate resin with; Mw = 10500 g/mol; Mn = 4100 g/mol, and hydroxyl content of 1.0% |
| MQ Resin 4 | Dow Silicones Corporation | Me-Capped polymethylsilicate resin with Mw = 5400 g/mol; Mn = 2900 g/mol, and hydroxyl content of 0.89% |

TABLE 1-continued

Starting Materials

| Starting Material | Source | Chemical Description |
|---|---|---|
| (D1) PSA additive 1 | DOWSIL ™ 7429 PSA Additive | 50% TRIETHYL BORATE delivered in 50% DOWSIL ™ Q2-7735 Adhesive |
| (D2) PSA Additive 2 | Meryer (Shanghai) Chemical Technology Co., Ltd. | 100% triethyl borate |
| Radical initiator 1, BPO | AkzoNobel | Dibenzoyl peroxide $(C_6H_5COO)_2$ -75 wt %; Water -25 wt % |
| Solvent 1 | Introduced as impurity in the other starting materials | Mixture of benzene, toluene, ethyl benzene, xylene, (BTEX) and heptane |
| PET | Hangzhou Dahlia Plastics Industry Co., Ltd. | Polyethylene terephthalate film, 50 μm thick |
| SUS | Cheminstruments | Stainless steel |
| Si Rubber A | XIAMETER ™ RBB-2030-40EN | a commercially available HCR |

In Table 1, the starting materials branded DOWSIL™, SILASTIC™, and SYL-OFF™ were commercially available from Dow Silicones Corporation.

In this Reference Example 1, samples of radical reaction curable compositions were prepared as follows, using the starting materials and amounts shown below in Tables 2 and 3. Amounts are in weight parts unless otherwise indicated. Starting material (A) the polyidorganosiloxane gum component and starting material (B) the polyorganosilicate resin component were dissolved in (E) the solvent under mixing until the resulting mixture was homogenous. Then then starting material (D) the trialkyl borate was thoroughly blended into the mixture above. Then starting material (C) the radical initiator 1, BPO was thoroughly blended into the mixture above. All the starting materials were mixed at RT.

TABLE 2

Comparative Examples of Radical Curable Compositions

| Sample/Starting Material | Comp 1 | Comp 2 | Comp 3 | Comp 4 | Comp 5 |
|---|---|---|---|---|---|
| GUM2 | 45.81 | 44.63 | 42.99 | 40.47 | 36.27 |
| GUM 4 | 0 | 0.41 | 0.99 | 1.86 | 3.33 |
| MQ Resin | 0.00 | 0.49 | 1.17 | 2.20 | 3.95 |
| MQ Resin 1 | 51.62 | 50.29 | 48.44 | 45.60 | 40.87 |
| PSA Additive 2 | 0 | 1.60 | 3.84 | 7.23 | 12.96 |
| Radical initiator 1 | 2.60 | 2.60 | 2.60 | 2.60 | 2.60 |

TABLE 3

Working Examples of Radical Curable Compositions

| Sample/Starting Material | Work 1 | Work 2 | Work 3 | Work 4 | Work 5 |
|---|---|---|---|---|---|
| GUM 1 | 16.26 | 10.81 | 11.25 | 11.48 | 0.00 |
| GUM2 | 32.97 | 37.82 | 39.35 | 40.14 | 40.14 |
| GUM 3 | 0 | 0 | 0 | 0 | 11.48 |
| GUM 4 | 1.82 | 1.01 | 0.41 | 0.09 | 0.09 |
| MQ Resin | 2.15 | 1.19 | 0.48 | 0.11 | 0.11 |
| MQ Resin 1 | 37.15 | 42.62 | 44.34 | 45.23 | 45.23 |
| PSA Additive 2 | 7.07 | 3.92 | 1.58 | 0.36 | 0.36 |
| Radical Initiator 1 | 2.60 | 2.60 | 2.60 | 2.60 | 2.60 |

The radical reaction curable compositions in Table 1 contained small amounts of residual Solvent 1, which was introduced with the starting materials.

Before the radical reaction curable compositions were coated on PET substrates, DOWSIL™ 7499 PSA Primer was coated onto the substrate with a thickness sufficient to provide a dry coat weight of 0.20 gsm after heating in an oven at 120° C. for 0.5 minute. The primer layer on the substrate provided a sufficient bonding between substrates and cured silicone pressure sensitive adhesives. In this Reference Example 2, the radical reaction curable compositions were coated on substrates and cured according to the following procedure. Each sample prepared as described above was applied on 50 μm thick PET film (7499 primer coated side) with a thickness sufficient to provide a dry coat weight of 50 μm thickness after heating in an oven at 80° C. for 2 minutes and at 160° C. for 2 minutes.

The resulting tape samples were then cut into 1 inch in width, and then applied to adherends such that the silicone pressure sensitive adhesive contacted the adherends. The adherends were SUS and Si Rubber A, and samples were kept at RT for 20 minutes after contacting the silicone pressure sensitive adhesive with the adherends before testing. This test was repeated, but samples were held at 70° C. for 1 day before testing.

TABLE 4

Calculated and Measured Values Regarding Comparative Radical Curable Compositions

| Sample | Comp 1 | Comp 2 | Comp 3 | Comp 4 | Comp 5 |
|---|---|---|---|---|---|
| Substrate (50 μm) | PET | PET | PET | PET | PET |
| Triethyl borate weight % | 0 | 1.59 | 3.84 | 7.23 | 12.97 |
| OH-GUM % | 45.81 | 45.04 | 43.97 | 42.33 | 39.6 |
| MQ (%) | 51.62 | 50.78 | 49.61 | 47.80 | 44.82 |
| Resin/Gum weight Ratio | 1.13 | 1.13 | 1.13 | 1.13 | 1.13 |

TABLE 5

Calculated and Measured Values Regarding Working Radical Curable Compositions

| Sample | Work 1 | Work 2 | Work 3 | Work 4 | Work 5 |
|---|---|---|---|---|---|
| Substrate (50 μm) | PET | PET | PET | PET | PET |
| Triethyl borate weight % | 7.07% | 3.92% | 1.58% | 0.36% | 0.36% |
| Vi-GUM % | 16.26 | 10.81 | 11.25 | 11.48 | 0.00 |
| OH-GUM % | 34.78 | 38.83 | 39.75 | 40.23 | 51.71 |
| Total GUM (%) | 51.04 | 49.64 | 51.00 | 51.71 | 51.71 |
| Vi-GUM/OH-GUM | 0.47 | 0.28 | 0.28 | 0.29 | 0.00 |
| MQ (%) | 39.30 | 43.81 | 44.82 | 45.34 | 45.34 |
| Resin/Gum weight Ratio | 0.77 | 0.88 | 0.88 | 0.88 | 0.88 |

In this Reference Example 3, the samples prepared as described in Reference Example 2 were tested, as follows. Each tape sample prepared as described above was tested for adhesion to the SUS and Si Rubber A adherends by peeling each tape from the adherends and checking if there was any silicone pressure sensitive adhesive transferred onto the adherends from the PET film. An Adhesion/Release Tester AR-1500 was used. The width of each PET sheet was 1 inch. Peel speed and angle were 0.3 m/min and 180°, respectively. The unit was grams/in. Results are shown below in Tables 6 and 7.

Adhesion to SUS test methods refers to the test standard ASTM D3330.
Clean stainless-steel plate with solvent. Apply tape sample (1 inch in width) to stainless-steel plate. Roll twice in each direction with a standard 2 kg test roller at a speed of 10 mm/s. Peel the sample from steel plate with AR-1500 with a peeling angle of 180° at rate of 300 mm/min after 20 min dwell time.

Adhesion to Silicone Rubber A test method refers to the test standard ASTM D3330. Clean silicone rubber sheet with solvent. Apply tape sample (1 inch, 25.4 mm in width) to silicone rubber sheet. Roll twice in each direction with a standard 2 kg test roller at a speed of 10 mm/s. Peel the sample from silicone rubber sheet using AR-1500 with a peeling angle of 180° at rate of 300 mm/min after 20 min dwell time.

Adhesion to silicone rubber (70° C.-1d) test method refers to the test standard ASTM D3330. Clean silicone rubber sheet with solvent. Apply tape sample (1 inch, 25.4 mm, in width) to silicone rubber sheet. Roll twice in each direction with a standard 2 kg test roller at a speed of 10 mm/s. Peel the sample from silicone rubber sheet using AR-1500 with a peeling angle of 180° at rate of 300 mm/min after aging sample at 70° C. for one day (24 hr).

Rheological data (Tg, G' at −30° C., −20° C., 25° C. and 100° C.) test method refers to test standard ASTM D4440-15 Cured pure silicone pressure sensitive adhesive films (without substrate) each having a thickness of 0.5 mm-1.5 mm were prepared for rheological properties testing on parallel plate with 8 mm in diameter on a rheometer, either TA DHR-2 or ARES-G2. Loss modulus G" and storage modulus G' at different temperatures (i.e., from 200° C. to −80° C.) were measured by a temperature ramp program with oscillation mode at a cooling rate of 3° C./min under 1 Hz and a strain of 0.25%. Tan delta was calculated by G"/G'. The glass transition temperature was defined as the temperature at peak point of tan delta. The results are shown below in Tables 6 and 7.

TABLE 6

Comparative Example Results

| Sample | Comp 1 | Comp 2 | Comp 3 | Comp 4 | Comp 5 |
|---|---|---|---|---|---|
| To SUS (RT-20 min) | 1058.3 | 831.2 | 634.5 | 599.2 | <10 |
| To Si-Rubber A (RT-20 min) | 248.5 | 1082.5 | 1290.1 | 1199.9 | 1017 |
| To Si-Rubber A (RT-1 d) | 588.7 | 1454.3 | 1694 | >2600 | 1369.6 |
| To Si-Rubber A (70° C.-1 d) | 2158.7 | >2600 | >2600 | >2600 | 2200 |
| Tg(° C.) | 2.76 | 26.23 | 68.67 | Can't be detected | Can't be detected |
| G' at (−30° C.) (kPa) | 5415.3 | 5422.7 | 7135.5 | 9460.0 | 22084.0 |
| G' at (−20° C.) (kPa) | 2093.4 | 3571.4 | 5519.4 | 7097.8 | 19218.1 |
| G' at (25° C.) (kPa) | 44.3 | 311.4 | 1307.7 | 3008.0 | 9014.6 |
| G' at (100° C.) (kPa) | 10.4 | 39.3 | 93.7 | 349.0 | 1633.7 |

TABLE 7

Working Example Results

| Sample | Work 1 | Work 2 | Work 3 | Work 4 | Work 5 |
|---|---|---|---|---|---|
| To SUS (RT-20 min) | 438.1 | 444.3 | 397.4 | 786.5 | 750.8 |
| To Si-Rubber A (RT-20 min) | 1981.1 | 1189.93 | 1065.7 | 620.9 | 692.3 |
| To Si-Rubber A (RT-1 d) | >2600 | 1611.7 | 1026 | 809.0 | 895.7 |
| To Si-Rubber A (70° C.-1 d) | >2600 | >2600 | >2600 | 1848.5 | 1433.7 |
| Tg(° C.) | Can't be detected | 1.52 | −8.93 | −26.24 | −28.09 |
| G' at (−30° C.) (kPa) | 2284.3 | 2719.4 | 1663.1 | 483.3 | 489.5 |
| G' at (−20° C.) (kPa) | 1653.1 | 1787.8 | 890.9 | 216.0 | 230.0 |
| G' at (25° C.) (kPa) | 344.7 | 302.9 | 112.5 | 49.5 | 58.7 |
| G' at (100° C.) (kPa) | 85.9 | 81.9 | 47.1 | 36.6 | 43.9 |

INDUSTRIAL APPLICABILITY

The examples above show that radical reaction curable compositions can be prepared that cure to form silicone pressure sensitive adhesives with desirable adhesive properties of adhesion to stainless steel of >300 g/inch, adhesion to silicone elastomer>500 g/inch at RT, and adhesion to silicone elastomer>1,400 g/inch at 70° C. The high adhesions make the interface between silicone pressure sensitive adhesive and substrates (adherends) strong enough to resist the delamination over repeated deformation tests of the flexible display device (e.g., by folding, bending, rolling or stretching tests). The silicone pressure sensitive adhesives may also have Tg≤5° C., G' at −30° C.<3 MPa, G' at −20° C.<2 MPa, G' at 25° C.<0.4 MPa, and G' at 100° C. of <0.1 MPa. The low Tg and low G' at broad temperature ranges makes the silicone pressure sensitive adhesive suitable for use at broad temperature ranges with low stress imposed onto other layers during repeated deformation tests (e.g., by folding, bending, rolling and stretching tests). This combination of properties makes the silicone pressure sensitive adhesive suitable for use in fabricating multilayer components of flexible display devices, particularly in optical components, lens(frame) mounting layers, and silicone hinge and bonding layers.

Definitions and Usage of Terms

All amounts, ratios, and percentages herein are by weight, unless otherwise indicated. The SUMMARY and ABSTRACT are hereby incorporated by reference. The articles, "a", "an", and "the" each refer to one or more, unless otherwise indicated by the context of the specification. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 8.

TABLE 8

Abbreviations

| Abbreviation | Definition |
| --- | --- |
| ° C. | degree Celsius |
| g | gram |
| G' | modulus |
| GPC | Gel permeation chromatography, used to measure molecular weight of the resin according to the method described in U.S. Pat. No. 9,593,209 |
| gsm | grams per square meter |
| HCR | high consistency rubber |
| k | kilo |
| LSR | liquid silicone rubber |
| m | meters |
| M | mega |
| Me | methyl |
| min | minute |
| mL | milliliter |
| mm | millimeters |
| Mn | Number Average Molecular Weight measured by GPC, in units of grams/mole |
| $M^{OH}$ | a monofunctional siloxane unit of formula ((HO)Me$_2$SiO$_{1/2}$) |
| $M^{Vi}$ | a monofunctional siloxane unit of formula (Me$_2$ViSiO$_{1/2}$) |
| mol | mole |
| Pa | Pascal |
| ppm | part per million |
| psi | pounds per square inch |
| RT | room temperature of 22° C. ± 2° C. |
| Tg | glass transition temperature |
| uL | microliter |
| μm or um | micrometer |
| Vi | vinyl |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and any other subrange subsumed within the range. As just one example, a range of "0.3 to 7.1" may be further delineated into a lower third, i.e., "0.3 to 2.5", a middle third, i.e., "2.6 to 4.8", and an upper third, i.e., from "4.9 to 7.1", and alternatively, the range "0.3 to 7.1" includes the subrange "0.3 to 1.5", "1.5 to 7.1", and "3.9 to 7.1" and the individual values 7.07, 3.92, and 1.58, each which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

What is claimed is:

1. A radical reaction curable composition for forming a silicone pressure sensitive adhesive, where the composition comprises:
   (A) a polydiorganosiloxane gum component comprising 0 weight % to 16.3 weight %, based on combined weights of starting materials (A) to (D), of (A-1) an aliphatically unsaturated polydiorganosiloxane gum of unit formula $(R^M{}_2R^U SiO_{1/2})_2(R^M{}_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the aliphatically unsaturated polydiorganosiloxane gum a plasticity of 20 mil (0.51 mm) to 80 mil (2.03 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926; and 34.7 to 51.8 weight % of (A-2) a hydroxyl-terminated polydiorganosiloxane gum of unit formula $((HO)R^M{}_2SiO_{1/2})_2(R^M{}_2SiO_{2/2})_{a'}$, where each $R^M$ is an independently selected monovalent hydrocarbon group of 1 to 30 carbon atoms that is free of aliphatic unsaturation; each subscript a' has a value sufficient to give the polydiorganosiloxane gum a number average molecular weight of ≥200,000 g/mol;

with the proviso that a weight ratio of (A-1) the aliphatically unsaturated polydiorganosiloxane gum : (A-2) the hydroxyl-terminated polydiorganosiloxane gum {(A-1):(A-2) ratio} <0.47:1;

39.3 weight % to 45.4 weight % of (B) a polyorganosilicate resin comprising unit formula $(R^M{}_3SiO_{1/2})_{z'}(SiO_{4/2})_o Z_{p'}$, where each $R^M$ is an independently selected monovalent hydrocarbon group of 1 to 30 carbon atoms that is free of aliphatic unsaturation, Z is a hydrolyzable group, subscript p' has a value sufficient to give the resin a hydrolyzable group content of >3% to 10%, subscripts z' and o' have values such that z' >4, o' >1, and a quantity (z' +o') has a value sufficient to provide the resin with a number average molecular weight of 500 g/mol to 5,000 g/mol;

where (A) the polydiorganosiloxane gum component and (B) the polyorganosilicate resin are present in a weight ratio of (B):(A) (Resin: Gum Ratio) <1.1:1;

0.01 weight % to 5 weight %, based on combined weights of starting materials (A) to (D), of (C) a radical initiator;

0.3 weight % to 7.1 weight %, based on combined weights of starting materials (A) to (D), of (D) a trialkyl borate;

0 weight % to 90 weight %, based on combined weights of all starting materials in the composition, of (E) a solvent.

2. The composition of claim 1, wherein (A) the polydiorganosiloxane gum component, each $R^M$ is an independently selected alkyl group of 1 to 6 carbon atoms;

and each $R^U$ is independently selected from the group consisting of vinyl, allyl, and hexenyl, and subscript a is sufficient to provide a plasticity of 30 mil (0.76 mm) to 70 mil (1.78 mm) to (A-1) the aliphatically unsaturated polydiorganosiloxane gum; and subscript a' is sufficient to provide a plasticity of 30 mil (0.76 mm) to 70 mil (1.78 mm) to (A-2) the hydroxyl-terminated polydiorganosiloxane gum.

3. The composition of claim 1, wherein the polyorganosilicate resin (B), each $R^M$ is an independently selected alkyl group of 1 to 6 carbon atoms; each Z is OH;

and the quantity (z' +o') has a value sufficient to provide (B) the polyorganosilicate resin with a number average molecular weight of 3,800 g/mol to 4,300 g/mol.

4. The composition of claim 1, where the radical initiator (C) comprises dibenzoyl peroxide.

5. The composition of claim 1, where the trialkyl borate (D) comprises triethyl borate.

6. A wet casting method comprising
1) applying the composition according to claim 1 to a substrate, and
2) curing the composition to form the silicone pressure sensitive adhesive on the substrate.

7. The method of claim 6, where the substrate is a silicone elastomer.

8. An article prepared by the method of claim 6.

9. The article of claim 8, where the article is a component of a lens(frame) mounting layer in a flexible display device.

10. The article of claim 8, where the article is a component of a silicone hinge and bonding layer in a flexible display device.

11. The article of claim 8, where the article is an optical component of a flexible display device and the substrate is an optical silicone elastomer.

12. A dry casting method comprising
1) applying the composition according to claim 1 to a release liner, 2) curing the composition to form the silicone pressure sensitive adhesive on the release liner, and
3) applying the silicone pressure sensitive adhesive to a substrate.

13. The method of claim 12, where the substrate is a silicone elastomer.

14. An article prepared by the method of claim 13.

15. The article of claim 14, where the article is a component of a lens(frame) mounting layer in a flexible display device.

16. The article of claim 14, where the article is a component of a silicone hinge and bonding layer in a flexible display device.

17. The article of claim 14, where the article is an optical component of a flexible display device and the substrate is an optical silicone elastomer.

18. A component of foldable display device comprising:
I) a silicone elastomer layer, and
II) a silicone pressure sensitive adhesive layer adhered to the silicone elastomer layer, wherein the silicone pressure sensitive adhesive layer is a product of the radical reaction curable composition of claim 1.

* * * * *

UNITED STATES PATENT AND TRADEMARK OFFICE
CERTIFICATE OF CORRECTION

| | | |
|---|---|---|
| PATENT NO. | : 11,773,305 B2 | Page 1 of 1 |
| APPLICATION NO. | : 17/918010 | |
| DATED | : October 3, 2023 | |
| INVENTOR(S) | : Qing Cao, Yan Zhou and Bochi Xu | |

It is certified that error appears in the above-identified patent and that said Letters Patent is hereby corrected as shown below:

In the Claims

Please remove the extra space between the '0' and the '.3 weight % to 7.1 weight % . . .' in Claim 1 at Column 19.

Signed and Sealed this
Thirtieth Day of January, 2024

Katherine Kelly Vidal
*Director of the United States Patent and Trademark Office*